Figure 1:
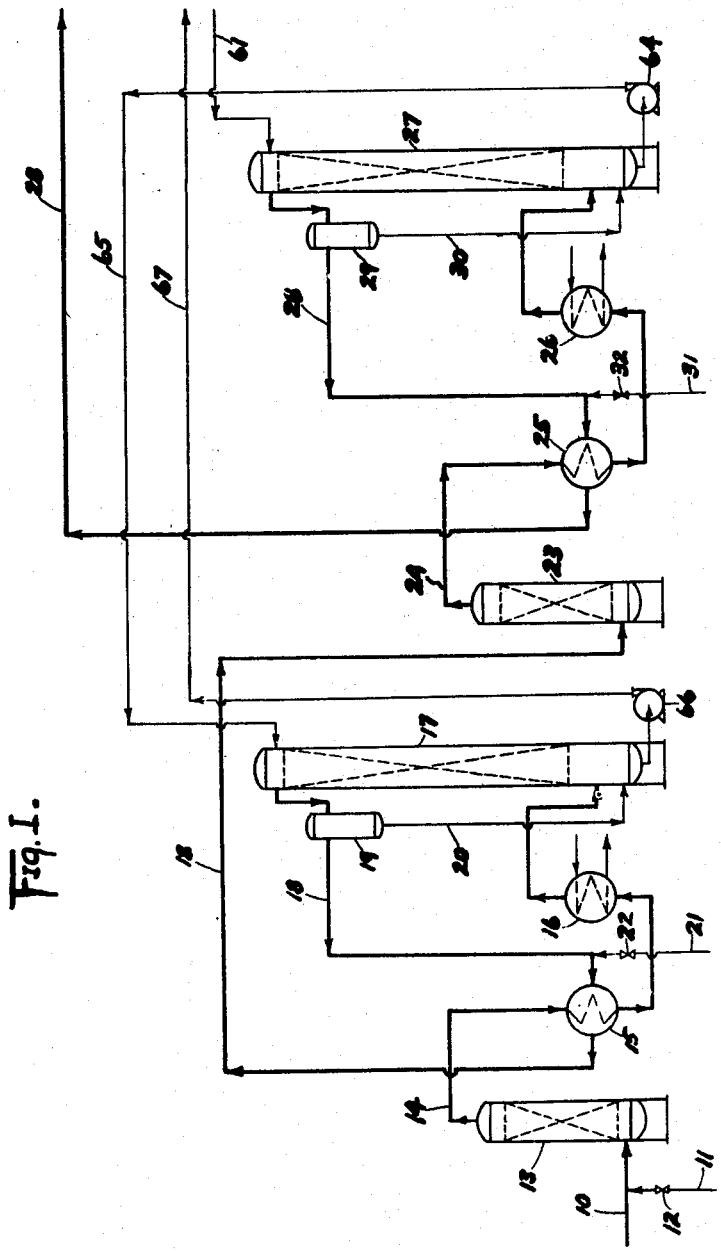

Inventor
ROBERT M. REED

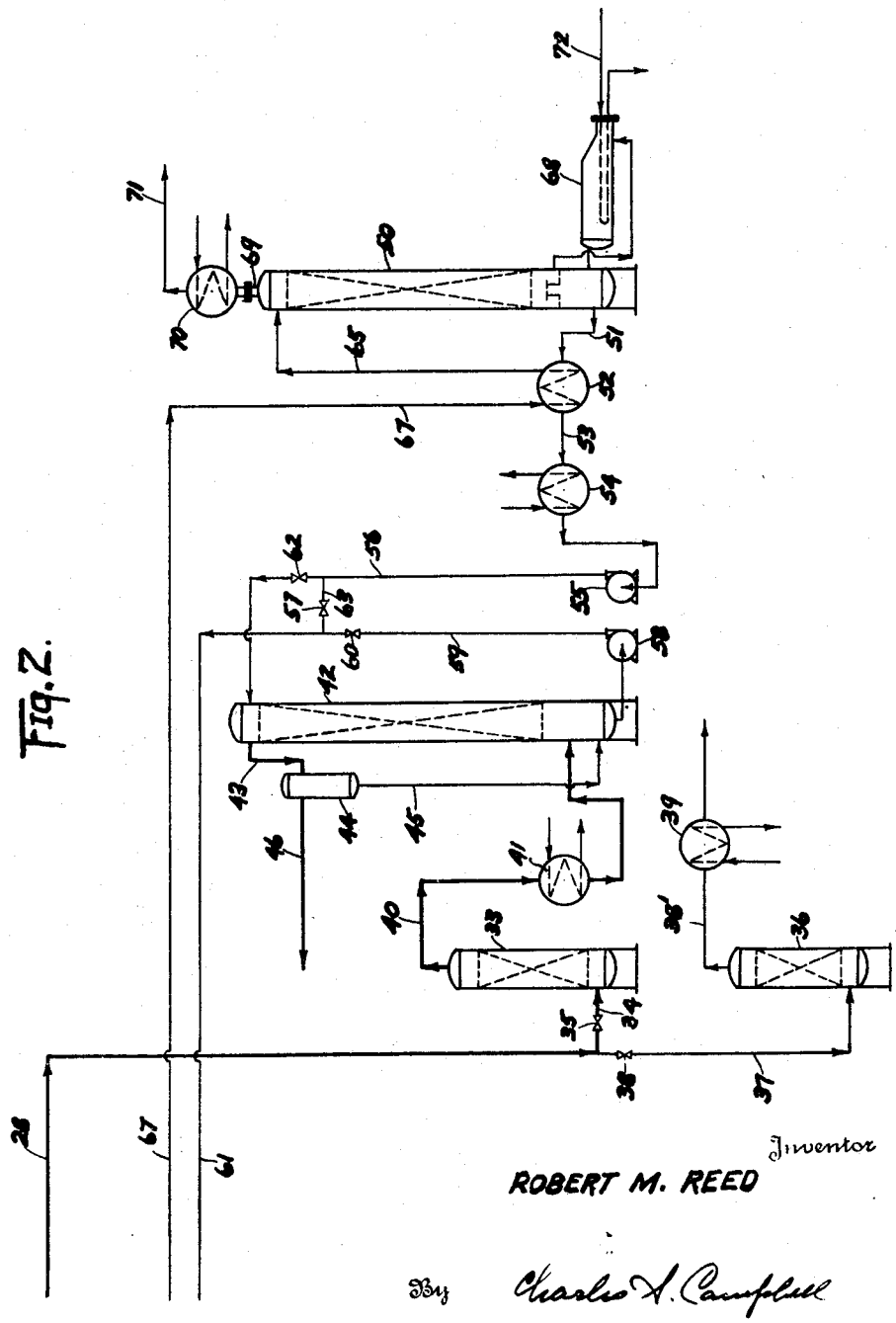

Patented Nov. 15, 1949

2,487,981

UNITED STATES PATENT OFFICE 2,487,981

METHOD AND APPARATUS FOR REMOVING CARBON MONOXIDE FROM GASEOUS MIXTURES

Robert M. Reed, Louisville, Ky., assignor to The Girdler Corporation, Louisville, Ky., a corporation of Delaware Application April 19, 1946, Serial No. 663,354

6 Claims. (Cl. 23—213)

The present invention relates to the separation of gases from mixtures thereof with other gases and more particularly to an improved process and apparatus for removing carbon monoxide from gaseous mixtures. As will later be described, the invention is adapted for employment in the general field of gas separation wherein one of the separated gases may be considered the chief product and another of the separated gases may be a by-product. It is within the scope of the present invention, however, to consider either or both of the separated gases as the chief product or products without necessitating material changes in operation of the process or equipment, since it is capable of producing simultaneously a plurality of substantially pure gaseous end products.

In the specific example of removal of carbon monoxide from mixtures thereof with hydrogen, which I have chosen to illustrate the invention, it becomes possible to produce economically a hydrogen product having a purity which heretofore was obtainable only through expensive electrolytic procedures, or by the expenditure of a considerable amount of thermal energy, and at the same time to obtain carbon dioxide having a purity equivalent to that required in most commercial usages. In various commercial uses of hydrogen, as for example in hydrogenation of edible oils, even a small fraction of carbon monoxide becomes an active catalyst poison and will render such hydrogen unsuitable for treatment with the widely used active nickel catalysts. Experience indicates that as little as a few hundredths of 1% of carbon monoxide in the hydrogen will render it unsuitable for certain catalytic hydrogenations.

It therefore is a principal object of the present invention to provide an improved method and apparatus for effecting removal of carbon monoxide from mixtures thereof with hydrogen or other gases.

Another important object of the invention is the provision of an improved process of removing carbon monoxide from a gaseous mixture by converting the carbon monoxide to carbon dioxide in successive conversion stages while removing the carbon dioxide after each conversion stage and before introduction of the carbon monoxide containing mixture into a succeeding conversion stage.

Another object is the provision, in a process of removing carbon monoxide from a gaseous mixture by oxidizing the carbon monoxide to carbon dioxide in a plurality of successive conversion stages while removing carbon dioxide intermediate said conversion stages, of an improved method of heating the gas mixture, after carbon dioxide removal therefrom, to proper temperature for introduction into a succeeding conversion stage.

Still another object of the invention is the provision, in a process of removing carbon monoxide from a gaseous mixture by oxidizing the carbon monoxide at relatively high temperature to carbon dioxide in a plurality of successive conversion stages while removing carbon dioxide from the gaseous mixture at reduced temperature intermediate said conversion stages, of an improved method and apparatus for utilizing the exothermic heat of reaction and sensible heat of the gaseous mixture in a preceding conversion step for heating the carbon monoxide containing gas mixture, after removal of carbon dioxide therefrom, to proper temperature for introduction thereof into a succeeding conversion stage.

Another object is to provide an improved process for producing hydrogen of exceptionally high purity from a mixture of gases containing hydrogen and carbon monoxide.

Another object is to provide an improved process for producing hydrogen of exceptionally high purity by converting a contaminant into a gas which may be readily removed by a liquid absorption medium.

A further object is the provision of an improved cyclic process for effecting multi-stage absorption of a gaseous constituent from a gaseous mixture by a liquid absorption medium and regenerating said medium for further use.

Although the invention has its principal application to the substantially complete removal of carbon monoxide, it may also be employed in the separation of a predetermined portion of the carbon monoxide in a gaseous mixture, for example in the preparation of a synthesis gas mixture from a mixture high in carbon monoxide for gasoline or methanol synthesis, and a further object of my invention is to provide an improved method and means for elimination of a desired portion of carbon monoxide from a mixture containing the same.

Various other novel features and objects will be apparent from, or will be pointed out in connection with, the following description and the accompanying drawing, in which:

Figure 1 is a diagrammatic view of one portion of a plant layout arrangement in which the invention may be practiced, and Figure 2 is a diagrammatic view of the supplemental portion of the same plant layout arrangement shown in Figure 1.

Although various modifications and rearrangements may be made without departing from the scope of the invention, a preferred form of plant layout suitable for obtaining all the advantages of my invention by carrying out the several coordinated steps to best advantage may be noted by reference to the drawings. The carbon-monoxide-containing-gas-mixture enters through the pipe 10 at the leftmost part of Figure 1 and after passing through the several coordinated steps of treatment, the resulting purified gas with a carbon monoxide content of as low a value as desired leaves the system as shown in Figure 2 through either pipe 38[1] or pipe 46 or both. Meanwhile carbon dioxide formed through the conversion or carbon monoxide or otherwise present in the incoming gas mixture is eliminated from the system through pipe 71. An absorbent solution passing from reactivator 50 at the right part of Figure 2 removes carbon dioxide from the gas mixture in two or more of the serially arranged absorbers 42, 27 and 17 and is returned to reactivator 50 in a continuous cycle. When it is desired to take advantage of the reduction in apparatus made possible by this invention in contrast to that of the prior art, the gas mixture entering the system through pipe 10 forms the highest pressure source of the gas path of travel. This gas mixture then passes through two or more of the four converters indicated generally at 13, 23, 33 and 36 in the embodiment as illustrated. Likewise the temperature level of the mixture in pipe 10 preferably is the highest temperature level in the system. Through this arrangement of mutually coordinated steps it therefore becomes possible to attain the valuable heat transfers, relative gas volumes, relative absorbent volumes, heat balances and pressure differentials characteristic of my invention, although as will be pointed out hereinafter a few of these steps independently are known in the prior art.

Referring now to a specific example of the invention, which for convenience will be described as applied in the removal of carbon monoxide from gaseous mixtures containing hydrogen and the recovery of an exceptionally pure hydrogen and a substantially pure carbon dioxide, attention is first invited to Figure 1. It will be understood that in the following description all references to specific pressures, temperatures, volumes and proportions are illustrative only and that the invention is not to be considered limited thereto except as defined by the appended claims.

A mixture of hydrogen, carbon dioxide and carbon monoxide derived from a catalytic reaction of hydrocarbons and steam, or from the conventional water gas reaction of coke and steam, or from any other source, enters pipe 10 at a temperature in the range of about 600°–1800° F. In the example chosen for illustration herein, the gas entering pipe 10 may consist of a mixture of approximately 20% carbon monoxide, 5% carbon dioxide, 75% hydrogen, admixed with steam. Such a mixture may result from the catalytic reaction of methane and steam and usually has a temperature of about 1500° F. and in the preferred form of my invention may enter pipe 10 at a pressure of about 10 pounds gauge. Through pipe 11 steam is introduced into the gas mixture through valve 12 in sufficient quantity to provide a suitable catalytic reaction in carbon monoxide converter 13, and at a sufficient temperature to insure that the entire mixture enters that converter at a temperature within the desired conversion range of about 600°–1000° F., the example chosen for illustration herein being approximately 750° F. Converter 13 may contain the well known iron oxide catalyst or other suitable conversion catalyst and in passing therethrough the bulk of the carbon monoxide present in the incoming gas is converted to carbon dioxide with the usual exothermic reaction which in the present illustration raises the temperature level of the gas mixture about 50° F., with the result that the mixture has a temperature of about 800° F. upon leaving the converter. At this time the gas mixture passing into pipe 14 contains approximately 1% of carbon monoxide, 18% carbon dioxide and 81% hydrogen, together with some steam. This relatively large volume of gas at relatively high temperature then passes through gas-to-gas heat exchanger 15 where its temperature is lowered to about 360° F. as a preliminary to absorption treatment at relatively low temperature. Thereafter the gas is passed through a conventional cooler 16 where its temperature is further lowered to the range of 60° F. to 140° F. and preferably about 100° F. whereupon it enters absorber 17. Any moisture condensed from this mixture in cooler 16 may be removed by any suitable means, not shown.

The action in the absorber 17 will later be described but for purposes of the present description it can be stated that while passing through the absorber substantially all of the carbon dioxide in the gas is absorbed and removed from the hydrogen gas. In so doing the volume of the gases leaving absorber 17 is approximately 18% less than that entering the absorber, thus automatically making possible the use of smaller equipment, smaller heat requirements and more economical treatment in the subsequent stages of the process. In leaving the absorber through pipe 18 the gas, which now is approximately 99% hydrogen, 1% carbon monoxide and with only traces of carbon dioxide, passes through a conventional separator apparatus 19 in which any solution entrained with the gases may be removed therefrom and from which this separated absorbent solution returns to the absorber through pipe 20. The gas thereafter is mixed with a quantity of steam, either saturated or superheated, entering pipe 18 through pipe 21 and valve 22, for the purpose of promoting conversion of the remaining carbon monoxide in the gas mixture.

It has been found that an important correlation exists between the concentration of carbon dioxide in the gaseous mixture during conversion, and the steam concentration needed to promote the conversion, and the heat requirements for bringing the reactants together at proper conversion temperature. By providing carbon dioxide removal intermediate the conversion steps and simultaneously utilizing the heat contained in the gases moving from the conversion steps, I have effected major economies in both the quantities of steam required for conversion and the quantities of heat required to raise the reactants to their reaction temperature.

The reaction $CO + H_2O = CO_2 + H_2$ is a reversible reaction, for which the equilibrium constant K may be expressed as $$K = \frac{(CO)(H_2O)}{(CO_2)(H_2)}$$

where ( ) represents the concentration (or partial pressure) of the constituent enclosed by the parentheses. It will be seen that the equilibrium concentration of carbon monoxide may be decreased to any desired value either by increasing the steam concentration, or by decreasing the concentration of carbon dioxide, or by changing both concentrations. I prefer therefore to remove the carbon dioxide as soon as possible in order to drive the reaction toward complete oxidation of the carbon monoxide and at the same time to use the minimum amount of steam. By removal of the carbon dioxide in absorber 17 I may introduce less steam than otherwise through pipe 21 in order to provide the necessary $H_2O$ for a complete reaction in the next converter. Moreover, as will be noted below, my improved arrangement of heat exchange steps also reduces the amount of steam which otherwise would need to be added to bring the total gaseous mixture up to the temperature level required in that next converter.

Furthermore, the equilibrium constant K varies with the temperature, becoming larger at higher temperatures. Consequently, the oxidation of carbon monoxide by steam proceeds more completely as the temperature is lowered, for given initial concentrations of reactants. This fact may be advantageously utilized in the invention since, as will later be described, the final stages of carbon monoxide oxidation preferably are carried out at progressively lower temperatures.

The gas mixture flowing through pipe 18, together with the steam required for the oxidation of the carbon monoxide, passes through the exchanger 15 whereupon the temperature of the entire mixture is raised to approximately 750° F. Thereafter the mixture flows through pipe 18 and enters converter 23. It will be noted that as a result of this novel arrangement the incoming initial gas mixture containing the exothermic heat of reaction generated in converter 13 gives up a substantial portion of this heat as well as of its sensible heat to a mass of carbon-dioxide-free gas, passing through exchanger 15 and having a volume 18% less than the initial gas mixture. As a result, supplementary heating of the gas going to converter 23 is avoided. The use of superheated steam having a temperature of about 750° F. and introduced into pipe 18 on the outlet side of heat exchanger 15 rather than through pipe 21 as shown is likewise considered as being within the scope of the invention. Since only 1% of the gas is to be converted in converter 23, the quantity of steam required in either case is relatively small as compared with the quantity of steam used in converter 13. Moreover, since only a small quantity of gas is converted in converter 23 the amount of heat generated by the exothermic reaction is comparatively small and the gases leaving converter 23 through pipe 24 remain at substantially 750° F. temperature.

This gas mixture thereupon flows under a pressure somewhat less than its original pressure of 10 pounds gauge through a gas-to-gas heat exchanger 25 leaving this exchanger at about 250° F. and passing through a cooler 26 in which its temperature is further reduced to about 100° F. whereupon it enters absorber 27. Any moisture condensed from this mixture in cooler 26 may be removed by any suitable means, not shown. In passing through absorber 27 the carbon dioxide is removed and separated from the gas stream which then enters pipe 28 with a carbon monoxide content of only about 0.1% and with only insignificant traces of carbon dioxide. This gas passes through the conventional separator apparatus 29 in which any solution entrained with the gases may be removed therefrom and from which this separated absorbent solution is returned to absorber 27 through pipe 30. The gas passing through pipe 28 into heat exchanger 25 may have a quantity of steam, either saturated or superheated, added thereto through pipe 31 controlled by valve 32. In certain usages of my invention described below the use of any steam at this point may be omitted. Upon leaving exchanger 25 the gas at a temperature of about 700° F then passes through pipe 28 to a point for further treatment. Superheated steam, as in the usage of exchanger 15, may be alternately added to the gas in line 28 after its passage through heat exchanger 25 in lieu of adding the steam through pipe 31.

Despite the relatively low carbon monoxide content (0.1%) in the hydrogen gas in pipe 28, this still is sufficient to render the hydrogen unsuitable for certain hydrogenation usage. Depending upon whether the presence of methane is or is not acceptable in the final hydrogen product, the gas from pipe 28, as shown in Figure 2 of the drawings, may be led into converter 33 through pipe 34 controlled by valve 35, or into converter 36 through pipe 37 controlled by valve 38. In the event converter 36 is employed the hot gases in pipes 28 and 37 are contacted in the converter with a conventional catalyst which promotes the reaction between carbon monoxide and hydrogen to produce methane and water. The mixture of hydrogen, methane and water vapor thereupon is led through outlet pipe 38₁, through cooler 39, to any suitable point of use, storage or further treatment. In this alternate final step of my invention no steam is added to the gas in pipe 28.

In the event a hydrogen product free of methane is desired, valve 38 in pipe 37 is kept closed and steam is added to the gas in pipe 28. The gas in line 28 thereupon flows through valve 35 and pipe 34 into converter 33, the action in which is similar to that in converters 13 and 23. Gas leaving converter 33 at about 700° F. contains less than 0.01% carbon monoxide and is passed through pipe 40 and cooler 41 into absorber 42. Upon leaving the absorber the hydrogen gas which is exceptionally pure passes through pipe 43 and separator apparatus 44 in which any solution entrained with the gases may be removed therefrom and returned to absorber 42 through pipe 45. The purified gas meanwhile passes to any suitable point of use or storage through pipe 46.

Reference now is made to the detailed arrangement which makes possible the efficient, rapid and economical removal of carbon monoxide above described. By the constant and prompt elimination of carbon dioxide in the various steps of the process, the presence of which would otherwise interfere with the complete oxidation of the carbon monoxide, I am able to reduce the carbon monoxide content to an exceptionally low proportion of its original volume in only three operations. At the same time the carbon dioxide may be recovered in a substantially pure form if so desired. Any conventional continuous cyclic process for removing the acidic carbon dioxide may be employed within the scope of the invention. However, I prefer to use the general process disclosed in U. S. Patent Reissue 18,958. For purposes of illustration, an aqueous solution of monoethanolamine having the characteristics well known in the art may be employed in my invention. An aqueous solution of this absorbent leaving the base of reactivator 50 as a "lean" solution substantially free of absorbed carbon dioxide passes through pipe 51, heat exchanger 52, pipe 53, cooler 54 and enters pump 55. From this pump it is moved under any desired pressure into pipe 56 through valve 62 and into absorber 42 in those uses of the invention in which three stages of absorption treatment is employed. Upon absorbing the small, but very significant amount of carbon dioxide found in the gases in absorber 42, the solution then passes from the bottom of the absorber through pump 58 and pipe 59, past valve 60 into pipe 61 leading to absorber 27 (shown in Figure 1). As will be apparent, when the methane conversion step is used absorber 42 may not be required and in such cases the flow of the absorbent solution would be through pipe 56, valve 57, bypass 63 and into pipe 61 with valves 62 and 60 remaining closed. Upon entering absorber 27 the solution removes the carbon dioxide from the gas therein, and passes from the bottom of that absorber through pump 64 into pipe 65. From pipe 65 the solution passes into absorber 17 where it performs its primary function of absorbing and removing from the hydrogen gas a large quantity of carbon dioxide which otherwise would interfere with the subsequent elimination of the remaining carbon monoxide.

Upon leaving absorber 17 the solution which now may be termed a "rich" solution passes through pump 66, pipe 67 and heat exchanger 52 back into reactivator 50. Because of the important necessity for removing substantially all carbon dioxide found in the gas in absorber 17, it is necessary to operate this and the other absorbers at the temperature most conducive to complete absorption. Also since the flow of gas through the system is preferably caused by the relatively small pressure existing in the incoming gas in pipe 10, the pressure in the absorbers is only slightly above atmospheric and the corresponding temperature of the solution is in the order of 100° F. when using the preferred absorbent solution. It will be understood that when other absorbents are used the temperatures may be substantially higher than 100° F. and that if gas pumps are used a higher temperature could also be employed. However, in any event a material difference in temperature will exist between the gas temperature required for efficient conversion in converters 13, 23 and 33 and the gas temperature required for efficient absorption in absorbers 17, 27 and 42. By means of the novel arrangement of the apparatus and in view of the removal of the carbon dioxide after each conversion stage in the process where it is present in any significant amount and due to the heat exchange relationships disclosed, I have thus been able to reconcile the mutually disadvantageous requirements of relatively high conversion temperatures and relatively low absorption temperatures. Moreover, by passing the "lean" absorbent solution coming from reactivator 50 into contact with the gas mixture containing the relatively smaller amounts of carbon dioxide, I am able to effect a prompt and efficient removal of the small amount of carbon dioxide.

Upon entering reactivator 50, which may be operated at any suitable pressure, the rich solution is stripped by hot vapor rising from the reboiler 68 and the pure carbon dioxide gas which is liberated will then pass out through outlet 69, through cooler 70 and be led through pipe 71 to a suitable point of use or storage. The reactivated solution passes through reboiler 68 which may be heated by any suitable source 72 of heating medium, and then passes into the base of the reactivator whence it may move again into pipe 51 to repeat the cyclic process.

From the foregoing description it will be noted that the invention does not require any appreciable supplementary heating of the gaseous mixture as it passes through the several steps even though the gases are lowered in temperature prior to entering the several absorption stages. The original sensible heat contained in the gases entering through pipe 10 is conserved and utilized throughout subsequent conversion stages. This improvement over the prior art is largely due to the fact that I remove the carbon dioxide intermediate the conversion stages and thus am able to drive the reversible reaction progressively toward complete oxidation of the remaining carbon monoxide without requiring large concentrations of steam in the converters. By utilizing the gas to gas heat exchangers and providing steam primarily for promoting oxidation of carbon monoxide, I avoid using large quantities of steam for supplementary heating purposes. An incidental advantage also resides in the fact that smaller coolers for the gases entering the absorbers may be used since the gaseous mixture has already been substantially reduced in temperature in passing through the gas to gas heat exchangers.

It will be obvious that if only a portion of the carbon monoxide in a gas mixture is to be removed, less than all of the converters and the other equipment indicated as being used in conjunction therewith may be employed without departing from the invention.

Having thus described my invention, I claim:

1. The process of treating a gas mixture containing carbon monoxide to reduce the carbon monoxide content thereof, which includes treating said mixture with steam in a high temperature conversion step to convert a part of the carbon monoxide into carbon dioxide, removing substantially all of said carbon dioxide from the resulting gas mixture in a relatively low temperature carbon dioxide removal step following said conversion step, further treating the resulting gas mixture with steam in a second high temperature conversion step following said removal step to convert additional carbon monoxide into carbon dioxide, and effecting heat exchange between the gas mixture passing to said removal step and the gas mixture leaving said removal step, thereby to cool the gas mixture passing to the removal step and to heat the gas mixture passing from said removal step to said second conversion step.

2. The process of treating a gas mixture containing carbon monoxide to reduce the carbon monoxide content thereof, which includes treating said mixture with steam in a conversion step at a temperature in the range of about 600° F. to about 1000° F. to convert a part of the carbon monoxide into carbon dioxide, removing substantially all of said carbon dioxide from the resulting gas mixture in a carbon dioxide removal step following said conversion step and at a temperature in the range of about 60° F. to about 140° F., further treating the resulting gas mixture with steam in a second conversion step following said removal step and at a temperature in the range of about 600° F. to about 1000° F. to convert additional carbon monoxide into carbon dioxide, and effecting heat exchange between the gas mixture passing to said removal step and the gas mixture leaving said removal step, thereby to cool the gas mixture passing to the removal step and to heat the gas mixture passing from said removal step to said second conversion step.

3. The process of treating a gas mixture containing carbon monoxide in a plurality of steps progressively to reduce the carbon monoxide content and progressively to increase the hydrogen content, which includes successively treating the gas mixture with steam in a plurality of high temperature conversion steps to convert carbon monoxide to carbon dioxide and produce hydrogen in each of said steps, removing carbon dioxide from the gas mixture in a plurality of relatively low temperature carbon dioxide removal steps in series with said conversion steps and each of which follows a respective one of the conversion steps, and causing the gas mixture delivered from each removal step that is followed by a conversion step to pass in heat exchange relation with the gas mixture delivered to the removal step, thereby to cool the gas mixture delivered to each such last mentioned removal step and to heat the gas mixture delivered therefrom to the next conversion step.

4. In a process of producing hydrogen, the steps of providing a mixture of gases containing hydrogen and carbon monoxide at relatively high temperature, treating said mixture with steam in a first high temperature conversion step to convert a part of the carbon monoxide into carbon dioxide and produce additional hydrogen, removing substantially all of said carbon dioxide from the resulting gas mixture in a relatively low temperature carbon dioxide removal step, further treating the resulting gas mixture with steam in a second high temperature conversion step to convert additional carbon monoxide into carbon dioxide and produce additional hydrogen, and effecting heat exchange between the gas mixture passing to said removal step and the gas mixture passing from said removal step to the second conversion step, thereby to cool the gas mixture passing to said removal step and to utilize the sensible heat from said first-mentioned gas mixture and the first conversion step for heating the gas mixture delivered from said removal step to the second conversion step.

5. An apparatus for reducing the carbon monoxide content of a gas mixture, which includes a plurality of converters in which carbon monoxide is reacted with steam to produce carbon dioxide and hydrogen, a plurality of absorbers in which carbon dioxide is removed from the gas mixture, said converters and said absorbers being arranged alternately in series whereby each absorber receives gas mixture from a preceding converter, and a plurality of heat exchangers each having a passage provided with an inlet connected to a converter and an outlet connected to the next absorber in series, and each also having a separate passage with an inlet from the same absorber whereby the gases flowing to each absorber which is followed by a converter are cooled by the gases flowing from said absorber.

6. An apparatus for reducing the carbon monoxide content of a gas mixture, which includes a plurality of converters in which carbon monoxide is reacted with steam to produce carbon dioxide and hydrogen, a plurality of absorbers in which carbon dioxide is removed from the gas mixture, said converters and said absorbers being arranged alternately in series whereby each absorber receives gas mixture from a preceding converter, a heat exchanger having a passage provided with an inlet connected to one of said converters and an outlet connected to the next succeeding absorber in the series, said heat exchanger also having a separate passage in heat exchange relation with said first mentioned passage, which said separate passage has an inlet connected to said last mentioned absorber and an outlet connected to the converter next following said absorber in said series, whereby the gases flowing from said first mentioned one converter to said next succeeding absorber are cooled, and the gases flowing from said last mentioned absorber to the converter next following said absorber are heated.

ROBERT M. REED.

REFERENCES CITED

The following references are of record in the file of this patent:

UNITED STATES PATENTS

| Number | Name | Date |
|---|---|---|
| 1,843,540 | Casale | Feb. 2, 1932 |
| 2,338,402 | Brandt | Jan. 4, 1944 |

FOREIGN PATENTS

| Number | Country | Date |
|---|---|---|
| 417,829 | Great Britain | Oct. 12, 1934 |